US009462623B2

(12) United States Patent
Jakusovszky et al.

(10) Patent No.: US 9,462,623 B2
(45) Date of Patent: Oct. 4, 2016

(54) METHOD AND SYSTEM FOR OPTIMIZED BLUETOOTH LOW ENERGY COMMUNICATIONS USING DYNAMIC BROADCASTING SCHEDULE

(71) Applicant: EM MICROELECTRONIC-MARIN S.A., Marin (CH)

(72) Inventors: Mark Jakusovszky, Colorado Springs, CO (US); Marc Morin, Colorado Springs, CO (US)

(73) Assignee: EM MICROELECTRONIC MARIN S.A., Marin (CH)

( * ) Notice: Subject to any disclaimer, the term of this patent is extended or adjusted under 35 U.S.C. 154(b) by 74 days.

(21) Appl. No.: 14/445,275

(22) Filed: Jul. 29, 2014

(65) Prior Publication Data
US 2016/0037566 A1 Feb. 4, 2016

(51) Int. Cl.
| H04W 4/00 | (2009.01) |
| H04W 8/00 | (2009.01) |
| H04W 72/00 | (2009.01) |
| H04W 76/02 | (2009.01) |

(52) U.S. Cl.
CPC ........... *H04W 76/023* (2013.01); *H04W 4/008* (2013.01); *H04W 8/005* (2013.01); *H04W 72/005* (2013.01)

(58) Field of Classification Search
CPC ............. H04W 4/008; H04M 1/7253; H04M 2250/02
See application file for complete search history.

(56) References Cited

U.S. PATENT DOCUMENTS

| 9,107,026 | B1 * | 8/2015 | Viswanadham | ...... H04W 8/005 |
| 2011/0153818 | A1 | 6/2011 | Vandwalle et al. | |
| 2012/0052802 | A1 * | 3/2012 | Kasslin | ................. H04W 48/12 455/41.2 |
| 2013/0040573 | A1 | 2/2013 | Hiillyard | |
| 2013/0109323 | A1 * | 5/2013 | Ruutu | .................. H04B 5/0031 455/68 |
| 2013/0217332 | A1 * | 8/2013 | Altman | .................. H04H 60/90 455/41.2 |
| 2013/0326495 | A1 * | 12/2013 | Reunamaki | ............... G06F 8/65 717/173 |
| 2014/0135042 | A1 * | 5/2014 | Buchheim | ................. G01S 1/68 455/456.6 |
| 2015/0372536 | A1 * | 12/2015 | Naskali | ..................... H02J 9/06 307/66 |

FOREIGN PATENT DOCUMENTS

| EP | 2741527 A1 | 6/2014 |
| WO | 2014/068366 A1 | 5/2014 |

OTHER PUBLICATIONS

Communication dated Sep. 2, 2015 from the European Patent Office in counterpart application No. 15175701.

(Continued)

*Primary Examiner* — Bobbak Safaipour
*Assistant Examiner* — Devan Sandiford
(74) *Attorney, Agent, or Firm* — Sughrue Mion, PLLC

(57) ABSTRACT

This concerns a Bluetooth Low Energy (BLE) device, or system, or method of operating a BLE device and a respective computer program. The BLE device comprises a transceiver to broadcast the at least one advertising packet, a processor connected to the transceiver to generate the advertising packet and/or to trigger broadcasting thereof according to a broadcasting schedule. The device further comprises a verification element connected to the processor and being capable of ascertaining if a predefined condition is met, at least one of the verification element and the processor is capable of modifying the broadcasting schedule based on the predefined condition's ascertainment.

14 Claims, 3 Drawing Sheets

(56) References Cited

OTHER PUBLICATIONS

Jia Liu et al: "Modeling and performance analysis of device discovery in Bluetooth Low Energy networks", Global Communications Conference (GLOBECOM), 2012 IEEE, IEEE, Dec. 3, 2012, pp. 1538-1543, XP032374889, DO 1: 10.1109/GLOCOM. 2012.6503332 ISBN: 978-1-4673-0920-2 * p. 1538-p. 1539 * * p. 1542 *.

"Bluetooth Specifications—Air Interface Protocol—Bluetooth Low Energy—Advertising State", Bluetooth SIG, Jun. 30, 2010, pp. 57-67, XP055210475, Retrieved from the Internet: URL:https://www.bluetooth.org/en-us/specification/adopted-specifications [retrieved on Sep. 1, 2015] * Chapter 4.4.2.2 Advertising Interval *.

* cited by examiner

METHOD AND SYSTEM FOR OPTIMIZED BLUETOOTH LOW ENERGY COMMUNICATIONS USING DYNAMIC BROADCASTING SCHEDULE

TECHNICAL FIELD

The present invention relates to the field of wireless communication between wireless communication devices. In particular the invention relates to a method, to a system as well as to a computer program for Bluetooth Low Energy communication and/or data transmission.

BACKGROUND OF THE INVENTION

Bluetooth Low Energy (BLE) is a wireless personal area network technology designed and marketed by the Bluetooth Special Interest Group aimed at novel applications, in particular in the fields of healthcare, fitness, security and home entertainment. Compared to 'classic' or 'conventional' Bluetooth, BLE is intended to provide considerably reduced power consumption and cost while maintaining a similar communication range.

With classical BLE systems, at least a pair of BLE devices, one of which is denoted as a peripheral and the other one of which is denoted as a hub, are capable of establishing a communication link. Typically, the peripheral device advertises or broadcasts while the hub scans. Once the hub identifies a suitable peripheral device it requests a connection, pairs with the peripheral device and takes control over the peripheral device. At that time, the peripheral device stops advertising and communication becomes 'closed' so that communication is solely established between the hub and the peripheral device. For implementation of such a standard method, a complete BLE stack of hardware must be implemented for both BLE devices. In addition, once the communication between the pair of BLE devices has been established the communication takes place point-to-point. It is only visible to the hub and to the connected peripheral device.

Bluetooth Low Energy communication may also be established by a different mode, namely by non-connectable undirected advertising, in short 'advertising mode'. There, the peripheral device only and exclusively advertises and is unwilling to and/or unable to pair or connect with the hub device. A drawback of this communication protocol is that there is no way for the peripheral device to get knowledge whether a broadcast packet or message has been correctly received by a hub device. Moreover, the peripheral device does not get any information about which of the multiplicity of available hub devices actually received or processed the previously broadcast packet or message.

Currently available BLE devices or so called BLE smart peripherals, when placed in advertise mode send packets of data, hence advertising packets, at regular intervals. Typically, the time interval between successive advertising packets is fixed. As a consequence the BLE device is in a constant or repeated need of sufficient electrical power. If the BLE device is implemented as a mobile device or if the BLE device is part of a mobile device, a power source, such as a battery will be depleted at a steady rate whether or not there is a reasonable expectation that a second BLE device, hence a viable hub is in the vicinity to receive and to process the advertising packets broadcast by the BLE device.

SUMMARY OF THE INVENTION

It is therefore an objective of the present invention to optimize and to reduce electrical power consumption of BLE devices operating in a non-connectable undirected advertising mode. It is a further objective to provide an intelligent control and power consumption scheme without any or without substantial detrimental effects in regard of the overall performance and functionality of the BLE device.

The invention further aims to provide a wireless communication system and a method of operating a Bluetooth Low Energy device in order to reduce power consumption and to extend battery lifetime, in particular for mobile BLE devices. In a further aspect the invention aims to provide a computer program to operate a Bluetooth Low Energy device and to reduce power consumption thereof.

According to a first aspect the invention relates to a Bluetooth Low Energy (BLE) device that is operating in an advertising mode to frequently broadcast at least one advertising packet to another BLE device located nearby. The BLE device comprises a transceiver to broadcast the at least one advertising packet. Typically, the transceiver is implemented as a transmitter having an antenna to transmit and to broadcast the at least one advertising packet.

The BLE device further comprises a processor connected to the transceiver to generate the advertising packet and/or to trigger broadcasting thereof according to a broadcasting schedule. Typically, the broadcasting schedule at least defines the time intervals or the time instance at which at least one advertising packet is to be repeatedly broadcast by the BLE device.

In addition the BLE device comprises a verification element connected to the processor and being capable of ascertaining if a predefined condition is met. By means of the verification element, various situations and circumstances can be detected and analyzed. On the basis of the verification element and the ascertainment conducted by the verification element, at least a probability can be estimated of whether the advertising packet broadcast by the transceiver is likely to be received by another, hence by a second BLE device, typically implemented as a hub.

Consequently, at least one of the verification element and the processor is capable of modifying the broadcasting schedule based on the predefined condition ascertainment. If the verification element conducts for instance a measurement or a detection in order to determine and to ascertain if the predefined condition is met, it may vary the broadcasting schedule in such a way that power consumption of the BLE device will be reduced. If for instance the BLE device is intended and configured to be installed inside a building and if the BLE device is only of further use when the environment is brightly illuminated, the predefined condition could be formulated to coincide with a predefined brightness level.

The verification element could then be, for instance, implemented as a brightness sensor, in particular in the form of a photodiode or some other kind of optical sensor. If the verification element detects or ascertains that the predefined condition, namely brightness above a predefined minimum value is not met, it is substantially unreasonable to continue with frequently broadcasting the advertising packets according to the broadcasting schedule. Since the environmental condition of operating the BLE device is not met at least one of the verification element and the processor are then capable of modifying the broadcasting schedule, for instance, in such a way that the time interval between successive broadcasting events of advertising packets is increased. In extreme situations it is even conceivable that broadcasting is entirely deactivated or interrupted.

By means of the verification element, the BLE device may dynamically and universally react to varying environmental or other predefined conditions that may change after implementation or installation of the BLE device. With the verification element and/or with the processor connected to the verification element, a condition-specific broadcasting behavior of a BLE device operating in non-connectable undirected advertising mode can be provided. By means of the verification element situations can be detected in which a continued and frequent broadcasting of the advertising packet is substantially useless. By modifying, in particular by extending the time interval between successive broadcasting events electrical energy can be saved and the lifetime of a battery and hence the lifetime or run time of the BLE device can be prolonged.

According to another embodiment, the verification element is capable of ascertaining at least one state variable of the BLE device. In this embodiment, the predefined condition is represented by the state variable. A state variable may represent any relevant status of the BLE device and/or of its components. In this way, the broadcasting behavior of the BLE device can be modified as a function of the performance of the BLE device itself. In situations where the performance of the BLE device constantly or abruptly decreases, a modification of the broadcasting behavior, hence of the broadcasting schedule may be helpful to extend the lifetime and a basic operability of the BLE device.

According to another embodiment, at least one of the verification element and the processor is capable of determining whether the energy or voltage of an energy source of the BLE device is above or below a predefined threshold. In this embodiment the state variable of the BLE device equals the voltage or the residual energy of an energy source, typically the voltage or the residual energy of a battery of the BLE device. In other words, the verification element is then capable of determining the status of a battery, i.e. a residual electrical power and/or a supply voltage provided by the battery. If either the remaining electrical power or the voltage drops below a predefined threshold the verification element and/or the processor of the BLE device may be capable of modifying the broadcasting schedule.

Typically, time intervals between successive advertising packets can be extended so that the overall lifetime of the battery can be prolonged. It is also reasonable and possible not only to alter the broadcasting schedule in the time domain but also to modify other broadcasting parameters, such as broadcasting power, intensity or broadcasting strength and/or the type of signals or the data actually transmitted via the advertising packet. When the remaining electrical power or voltage drops below a predefined lower threshold it is conceivable that either the verification element or the processor switch into a fail safe mode, in which the amount of data of the advertising packet is reduced compared to a default broadcasting schedule or wherein the advertising packet is indicative of the fact that the BLE device is running out of electrical energy and will cease to broadcast advertising packets soon. In this way, other BLE devices, such as BLE hubs can be informed of the respective status of the broadcasting or advertising BLE device.

According to another embodiment, the verification element is capable of ascertaining or determining at least one ambient parameter. In particular, the verification element is capable of quantitatively determining or to quantitatively measuring at least one ambient parameter. The particular type of ambient parameter to be ascertained or to be measured depends on the intended application or implementation of the particular BLE device. If the BLE device is for instance to be implemented in an alert mechanism in order to indicate to a user or to other BLE devices that e.g. the ambient temperature rises above a maximum threshold or drops below a minimum temperature, the ambient temperature to be measured by the verification element represents the at least one ambient parameter. There are many different application scenarios conceivable, whereby different types of ambient parameters may be measured or ascertained by the verification element.

According to another embodiment, the verification element comprises at least one sensor. By means of a particular sensor not only the existence of an ambient parameter but also its magnitude can be precisely determined. The specific type of sensor depends on the application scenario, to which the respective BLE device is dedicated.

In another embodiment, at least one sensor is sensitive to at least one of the following physical quantities: electric field, magnetic field, electromagnetic radiation, temperature, sound, pressure, physical contact or humidity. It is even conceivable, that at least one sensor is sensitive to chemical quantities. It may be implemented as a gas sensor for instance or as a pH-sensor.

Accordingly, the sensor is implementable as an electrostatic sensor, as a magnetic sensor, as an optical sensor, and as a photodiode or similar optical detection devices. The sensor may be implemented as a temperature sensor, as a microphone, as a pressure sensor, as a switch or as a humidity sensor. Since the sensor is generally not limited to a particular type of sensor, almost any physically or chemically measurable quantity can be detected and quantitatively measured with the sensor. For instance, the sensor may be implemented as a distance sensor, by way of which the presence of a person or of a second BLE device within a pre-defined vicinity around the BLE device can be detected.

In another embodiment, the verification element is capable of at least temporally deactivating at least one of the processor and the transceiver. Deactivation of the processor and/or of the transceiver is typically conducted if the predefined condition is not met and when hence a further default operation of the BLE device would be substantially unreasonable, since the likelihood, that the broadcast advertising packet would be received and processed by a second BLE device is rather low.

It is also conceivable, that it is not the verification element but the processor which is capable of temporally deactivating the transceiver. In such an embodiment the BLE device is further active but does not transmit or broadcast advertising packets, at least for a predefined period of time. In this context it is even conceivable that deactivation of the processor and/or of the transceiver occurs only during a predefined time interval, which may range from several minutes to hours or even days.

In still another embodiment, at least one of the verification element and the processor is capable of modifying the period of time between successively broadcast advertising packets in response to the ascertainment of the predefined condition conducted by the verification element. Typically, the time period between successive advertising packets is increased if the predefined condition is not met. The time period will be decreased if the predefined condition is met. It is also conceivable that the verification element defines or ascertains a certain likelihood, hence a probability, of whether a predefined condition is met or not met.

In this case, the period of time between successively broadcast advertising packets could be gradually adapted to the likelihood of whether the predefined condition is met. In this way the reduction of power consumption is in a reasonable balance with a potential decrease in advertising or broadcasting performance of the BLE device.

In another embodiment, at least one of the verification element and the processor is capable of modifying at least one of the power level and content of at least one advertising packet in response to the ascertainment of the predefined condition. If for instance the predefined condition is not met and if one can reasonably assume that an advertising packet would not be received by a second BLE device, the intensity of the broadcasting of the advertising packet, hence the broadcasting power can be reduced in order to save energy.

Alternatively or additionally, the transceiver or the processor may be switched into a kind of fail safe mode, in which the content of the advertising packet is reduced or modified. In this way, the second BLE device and/or a user thereof can be informed that, for instance, the BLE device is running out of power soon.

In another aspect, the invention also relates to a wireless communication system comprising at least a first BLE device as described above. The first BLE device is operable and is actually operated in a non-connectable undirected advertising mode. The first BLE device therefore acts as a BLE smart peripheral. The wireless communication system further comprises at least a second BLE device to receive at least one advertising packet broadcast by the first BLE device. In this way, at least a unidirectional communication from the first BLE device to the second BLE device can be established.

According to another aspect the invention also relates to a method of operating a Bluetooth Low Energy (BLE) device as described above, wherein the BLE device is operated in an advertising mode to frequently broadcast at least one advertising packet to another, hence to a second BLE device according to a broadcasting schedule. The method comprises the steps of ascertaining if a predefined condition is met by means of the verification element of the first BLE device. In another step the method modifies the broadcasting schedule of the first BLE device on the basis of the ascertainment of the predefined condition which is typically conducted by the verification element.

In general, the method of operating the BLE device is directly related to the operation of the above described BLE device. In this way, all features, effects and advantages described with respect to the BLE device are equally valid for the method of operating the same; and vice versa.

According to a further embodiment of the method ascertaining of the predefined condition comprises at least one of the following:
- ascertaining of at least one state variable of the BLE device, or
- ascertaining at least one ambient parameter by means of at least one sensor.

As already described above, detection or measuring of a state variable of the BLE device or detection or measurement of at least one ambient parameter allows one to draw a conclusion of whether it is reasonable to continue broadcasting of advertising packets according to a default broadcasting schedule or whether it is likely that broadcast advertising packets will not be received by other, hence second BLE devices.

In a further embodiment of the method, modifying of the broadcasting schedule comprises at least one of the following:
- at least temporarily deactivating at least one of the processor and the transceiver, and one of:
- modifying the period of time between successively broadcast advertising packets, or
- modifying at least one of the output power level and content of at least one advertising packet.

In this way, various different actions may take place in response to the detection or ascertainment that a predefined condition is met or not met. The various options allow one to save energy and to extend battery lifetime and hence to extend the performance or lifetime of the BLE device itself.

In still another aspect the invention also relates to a computer program to operate a first Bluetooth Low Energy (BLE) device as described above, which device is operated by the computer program in an advertising mode to frequently broadcast at least one advertising packet to a second BLE device according to a broadcasting schedule, hence a default broadcasting schedule. The computer program comprises program means for ascertaining by means of the verification element if a predefined condition is met. The computer program further comprises program means for modifying the broadcasting schedule on the basis of the ascertainment of the predefined condition.

Typically, the above described method of operating the BLE device is implementable by this particular computer program. Typically, the computer program is installed and deployed in the processor and/or in the verification element of the above described BLE device. Hence, functionality and operation of the BLE device may be controlled and governed by the respective computer program. Hence, the computer program, the BLE device and the method of operating the same are directly interrelated to each other. In general, all features, benefits and effects as described in connection with the BLE device, the wireless communication system and the method of operating the BLE device are equally valid for the computer program; and vice versa.

In the present context, Bluetooth smart technology or Bluetooth Low Energy technology operates in a frequency range between 2.400 GHz to 2.4835 GHz ISM band. BLE devices typically have 40 2 MHz channels. Within a channel, data is transmitted using Gaussian frequency-shift modulation. BLE-based communication is typically broadcast on the basis of a bit rate of 1 Mb/s with a maximum transmit power around 10 mW.

BRIEF DESCRIPTION OF THE DRAWINGS

In the following, various embodiments of the present invention will be described by making reference to the drawings, in which.

DETAILED DESCRIPTION OF EMBODIMENTS OF THE INVENTION

Figure 1:
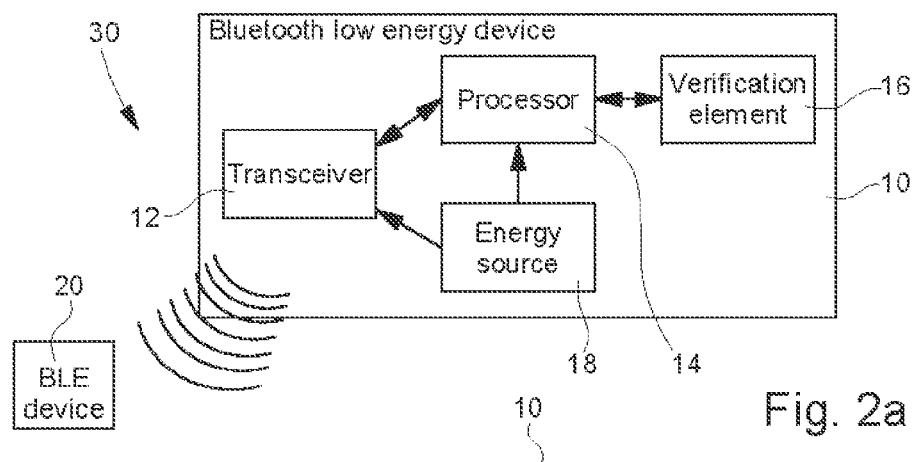
FIG. 1 schematically shows a wireless communication system comprising a first and a second BLE device.

The wireless communication system 30 as illustrated in FIG. 1 comprises a first BLE device 10, hence the BLE device 10 that is operated in non-connectable undirected advertising mode, but said device can be used in any RF beaconing technology. The first BLE device 10 operates as a BLE smart peripheral while a second BLE device 20 operates as a hub in the vicinity of the first BLE device 10 to receive at least one advertising packet 11 broadcast by the first BLE device 10. Internally, the first BLE device 10 comprises a transceiver 12, a processor 14, which may be typically implemented as a microcontroller and a verification element, that serves and acts as a gate or gating element. Furthermore, the first BLE device 10 comprises an energy source 18, typically in form of a battery with finite electrical energy or other types of battery. Said energy source 18 can be also a PV cell, a piezo element and other energy harvesting sources.

The verification element 16 is capable of ascertaining whether a predefined condition is met. For instance, the verification element 16 may determine or may measure a voltage level or a remaining energy level of the energy source 18. In response to such an ascertainment either the verification element 16 itself, or the processor 14 connected to the verification element 16 is capable of modifying the broadcasting schedule or the broadcasting behavior of the transceiver 12. Typically, the time interval between successively broadcast advertising packets 11 can be extended or shortened depending on the ascertainment of the predefined condition.

If the ascertainment is indicative that there is a high likelihood that the second BLE device 20 is in receiving vicinity to the first BLE device, the time interval between successive advertising packets 11 may be reduced. In other situations, where ascertainment of a predefined condition gives an indication that the likelihood of a second BLE device in the vicinity of the first BLE device 10 is rather low, then, for reasons of saving electrical energy, the time interval between successive advertising packets 11 will be increased.

But not only can the time interval between successive advertising packets 11 be modified. Alternatively or additionally, it is conceivable, that the advertising packets 11 themselves become subject to a modification. It is conceivable, that the advertising packets 11 are broadcast with a reduced broadcasting power, hence with a reduced strength. Additionally or alternatively, the advertising packets 11 may be modified in regard of their data content. The overall data transmitted or broadcast by the advertising packets 11 may be reduced for reasons of saving energy.

Furthermore, the content of the advertising packets 11 may be modified in order to indicate to the second BLE device 20, that the first BLE device 10 is running in a fail safe mode.

Figure 2A:
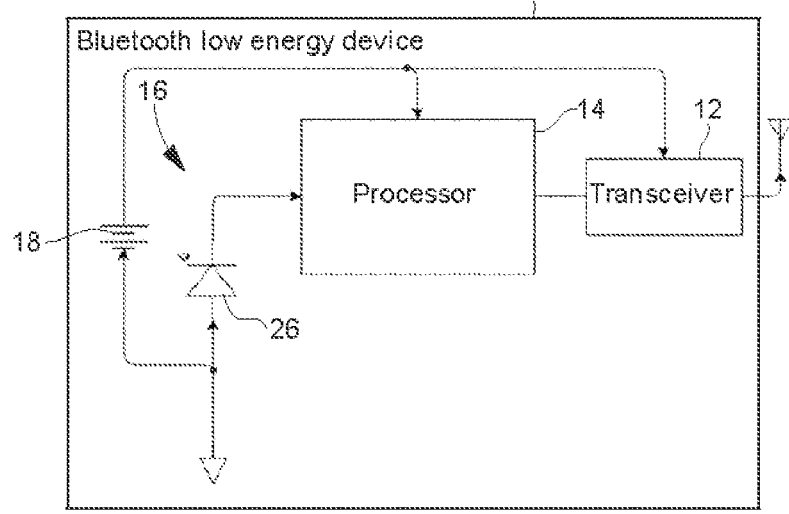
FIGS. 2a and 2b are illustrative of two embodiments of block diagram of the first BLE device.

In FIG. 2a, a more detailed implementation of an example of a BLE device 10 is provided. There, the processor 14 is implemented as a microcontroller and the verification element 16 comprises a sensor 26, presently implemented as a photodiode. The transceiver 12 may be implemented as a conventional BLE transceiver in order to broadcast advertising packets 11 within the BLE frequency range. An energy source 18 like a battery is connected to the processor 14 and to the transceiver 12.

In the embodiment according to FIG. 2a, the sensor 26 is sensitive to incident light, in particular in the visible range. When incident light is present on the sensor 26, the sensor 26 pulls down an interrupt of the processor 14, thereby signaling, that BLE-based broadcasting should begin. In situations, where there is no light present, the input of the processor 14 is pulled up and the broadcasting of the BLE device 10 is effectively turned off, thus saving battery power.

It is generally to be mentioned that implementation of a photodiode as a sensor 26 is only exemplary. Various other types of sensors, such like accelerometers, thermistors, RFID sensors, contact switches and so on can be alternatively or additionally implemented in the BLE device 10.

Figure 2B:
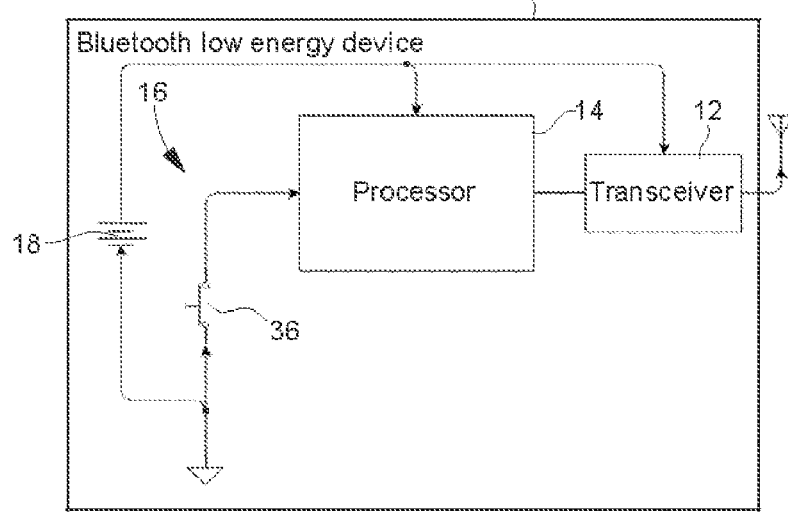

In FIG. 2b, another embodiment of the BLE device 10 is shown. For this embodiment the verification element 16 is a pushbutton 36. The other components of the device are the same that the components explained with reference to FIG. 2a.

Figure 3:
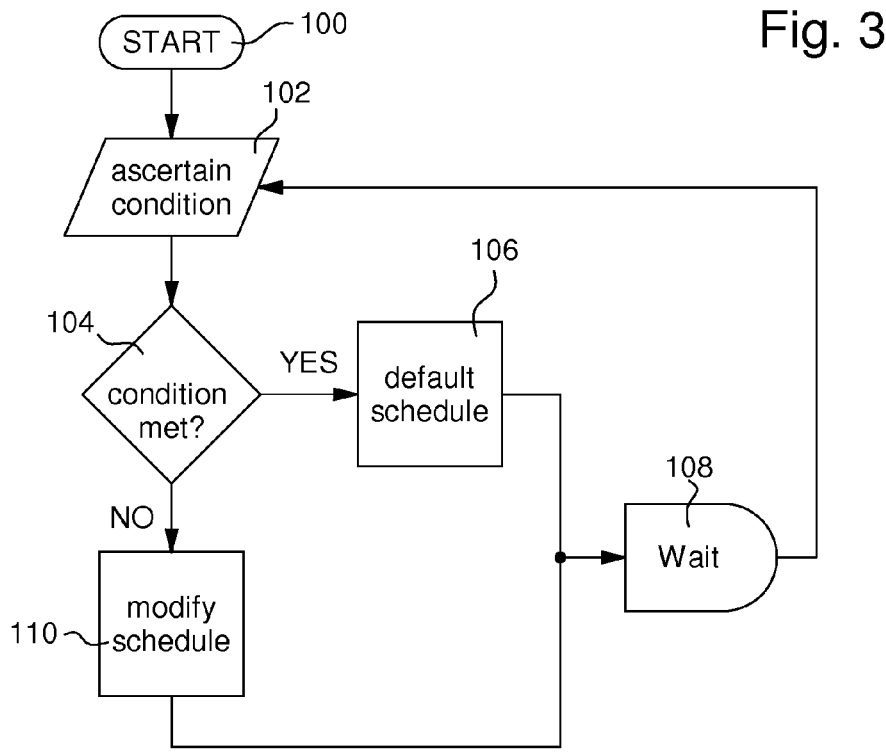
FIG. 3 shows a flowchart of method of operating the BLE device in a first embodiment.

In FIG. 3 a flowchart of a rather generic method of operating the BLE device 10 is illustrated. In a first step 100, the method starts. In a second step 102, a predefined condition is ascertained by the verification element. In the proceeding step 104, the ascertained condition is compared with the predefined condition, typically with a respective threshold. If in step 104 it is determined that the predefined condition is met, the method continues with step 106, in which the broadcasting schedule of the processor 14 and the transceiver 12 remains unchanged or in which the broadcasting schedule is subject to reset or in which the broadcasting schedule switches to a default broadcasting schedule. Thereafter, in step 108, a certain delay is implemented until the method returns to step 102.

If the predefined condition in step 104 is not met, then the method continues with step 110, in which the broadcasting schedule is modified in such a way to save energy and to extend lifetime of the energy source 18. Thereafter, the method also continues with step 108 before the method returns to step 102. The loop of the steps 102-108 or 102-110 is continuously processed until the BLE device is either switched off or runs out of electrical energy.

Figure 4:
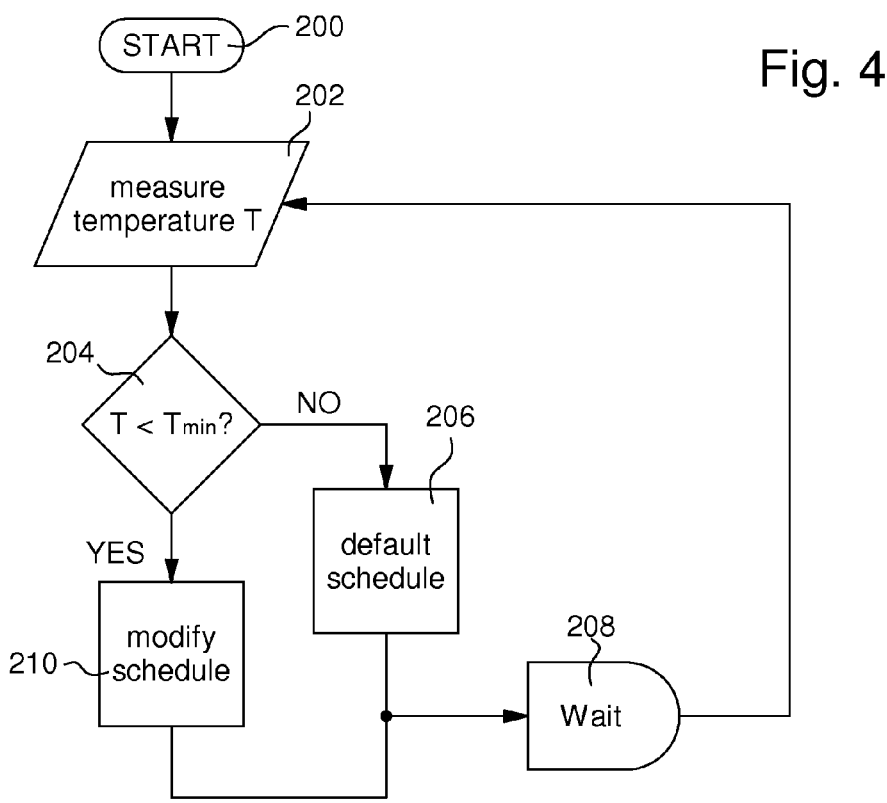
FIG. 4 is illustrative of a flowchart of a method conductible by a second embodiment of the BLE device.
Figure 5:
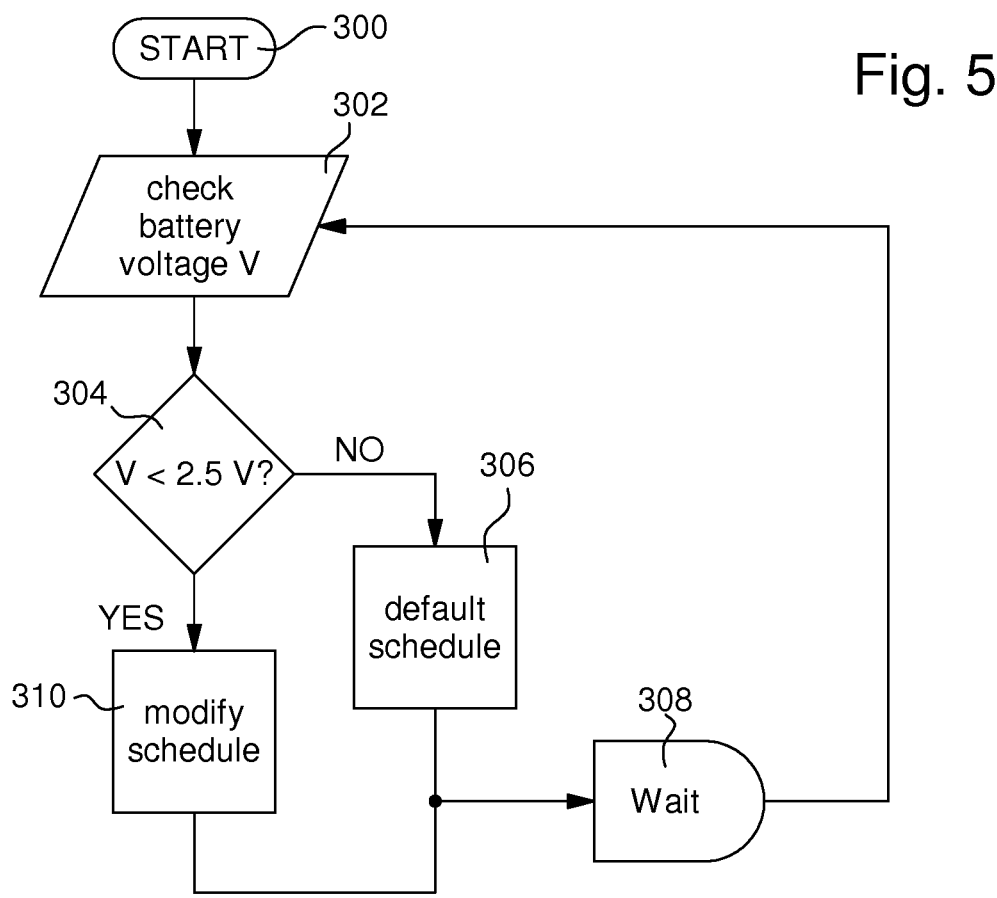
FIG. 5 is illustrative of another operation mode of a further implementation of the BLE device.

The topology and the general processing of the methods according to FIGS. 4 and 5 is similar to the generic method as described in FIG. 3. The various method steps are rather similar. In FIG. 4, various method steps have been increased by 100 in comparison to the method steps 100-110 according to FIG. 3. Accordingly, the method steps 300-310 as illustrated in FIG. 5 are increased by the number of 200 in comparison to the method steps as shown in FIG. 3.

The flowchart according to FIG. 4 is illustrative of an embodiment of the BLE device 10, wherein the verification element 16 comprises a temperature sensor 26. After having started in step 200, in the proceeding step 202 the temperature sensor is read. In the proceeding step 204, a temperature T measured by the sensor 26 is compared with a predefined minimum temperature Tmin. If the measured temperature T is larger than or equal to e.g. a freezing temperature Tmin the method continues with step 206, in which the broadcasting schedule of the BLE device 20 is left unchanged or in which a default broadcasting schedule is selected or activated. Thereafter, in step 208 the method waits for a comparatively large period of time, e.g. in the range of several minutes before it returns to step 202. In this specific embodiment, the default broadcasting schedule may almost represent or equal a complete deactivation of the BLE device. As long as the measured temperature is above a lower threshold, there is no reason to actually activate the freezing alert implemented by the BLE device.

If in step 204, the measured temperature T is lower than the predefined temperature Tmin, the BLE device 10 is switched in the subsequent step 210 into a broadcasting mode with a modified broadcasting schedule. In the implementation according to FIG. 4, the BLE device 10 is implemented as a freezing alert mechanism, which starts to broadcast respective advertising packets at a rather frequent rate only when the temperature drops below a predefined threshold, e.g. below the freezing temperature. Depending on the ambient temperature T the method either switches the BLE device 10 into a kind of a sleep mode in step 206 or into a kind of transmitting or alert mode 210.

In the flowchart according to FIG. 5 the BLE device 10 is implemented as a battery alert. After starting in step 300, the method actually reads or ascertains the battery voltage in step 302. If in the subsequent step 304 the measured battery voltage V is below a predefined threshold, for instance below 2.5 V, the method continues with step 310, in which the broadcasting schedule is modified compared to a default broadcasting schedule according to which advertising packets are broadcast when the battery voltage is above the predefined threshold.

For instance, the time interval between successive advertising packets 11 may be set to 1 second or even larger. Thereafter, in step 308, the method waits for a predefined period of time, e.g. for 10 minutes or even longer before the method returns to step 302. If in step 304 the measured voltage V is larger than or equal to the lower threshold voltage of e.g. 2.5 V then the method continues with step 306, in which the BLE device 10 returns into its default broadcasting schedule. As an example, the time interval between successively broadcast advertising packets 11 can be reduced to 100 ms or even below in step 306 before the method continues with step 308 and further returns to step 302.

The invention claimed is:

1. A Bluetooth Low Energy (BLE) device operating in an advertising mode to frequently broadcast at least one advertising packet to another BLE device, the BLE device comprising:
   a transceiver to broadcast the at least one advertising packet in a non-connectable undirected advertising mode,
   a processor connected to the transceiver to generate the advertising packet and/or to trigger broadcasting thereof according to a broadcasting schedule,
   an energy source connected to the processor and to the transceiver,
   a verification element, which comprises at least one sensor or a pushbutton, connected to the processor and configured to determine a predefined condition is met based on detected energy level from the energy source,
   wherein, based on the determination, at least one of the verification element and the processor modifies a strength of the advertising packets, a size of the advertising packets, and an interval between successive broadcasting events of the advertising packets, to reduce electrical power consumption of the BLE device.

2. The BLE device according to claim 1, wherein the verification element is configured to ascertain at least one state variable of the BLE device.

3. The BLE device according to claim 2, wherein at least one of the verification element and the processor is configured to determine whether the energy or voltage of an energy source of the energy source is above or below a predefined threshold.

4. The BLE device according to claim 1, wherein the verification element is configured to measure at least one ambient parameter.

5. The BLE device according to claim 1, wherein the at least one sensor is sensitive to at least one of the following physical quantities: electric field, magnetic field, electromagnetic radiation, temperature, sound, pressure, physical contact or humidity.

6. The BLE device according to claim 1, wherein the verification element is configured to at least temporarily deactivating at least one of the processor and the transceiver.

7. The BLE device according to claim 1, wherein at least one of the verification element and the processor is configured to modify the period of time between successively broadcast advertising packets in response to the determination of the predefined condition.

8. The BLE device according to claim 1, wherein at least one of the verification element and the processor is configured to modify at least one of the output power level and content of at least one advertising packet in response to the determination of the predefined condition.

9. A wireless communication system comprising at least a first BLE device according to claim 1 and comprising at least a second BLE device to receive at least one advertising packet broadcast by the first BLE device.

10. A method of operating a Bluetooth Low Energy (BLE) device in an advertising mode to frequently broadcast at least one advertising packet to another BLE device according to a broadcasting schedule, wherein the method comprises:
    broadcasting, by a transceiver, the at least one advertising packet in a non-connectable undirected advertising mode,
    generating, by a processor, the advertising packet or triggering broadcasting thereof according to the broadcasting schedule,
    determining, by a verification element comprising at least one sensor or pushbutton, a predefined condition is met based on detected energy level from an energy source, and
    modifying, based on the determination, a strength of the advertising packets, a size of the advertising packets, and an interval between successive broadcasting events of the advertising packets to reduce electrical power consumption of the BLE device.

11. The method according to claim 10, wherein the determining of the predefined condition comprises at least one of:
    ascertaining at least one state variable of the BLE device,
    ascertaining at least one ambient parameter by said at least one sensor of the verification element.

12. The method according to claim 10, wherein modifying of broadcasting schedule comprises at least one of the following:
    at least temporarily deactivating at least one of the processor and the transceiver by the verification element,
    modifying the period of time between successively broadcast advertising packets,
    modifying at least one of the output power level and content of at least one advertising packet.

13. A non-transitory computer readable medium storing computer executable instructions for operating a Bluetooth Low Enemy (BLE) device in an advertising mode to frequently broadcast at least one advertising packet to another BLE device, which when executed by the BLE device cause the following operations comprising:
    broadcasting, by a transceiver, the at least one advertising packet in a non-connectable undirected advertising mode,
    generating, by a processor, the advertising packet or triggering broadcasting thereof according to a broadcasting schedule,
    determining, by a verification element, a predefined condition is met based on detected energy level from an energy source, and
    modifying, based on the determination, strength of the advertising packets, size of the advertising packets, and interval between successive broadcasting events of the advertising packets to reduce electrical power consumption of the BLE device.

14. The BLE device according to claim 1, wherein the verification element is at least two of accelerometer, thermistor, RFID sensor, and a contact switch.

\* \* \* \* \*